United States Patent
Mizushima et al.

(10) Patent No.: US 6,953,616 B2
(45) Date of Patent: Oct. 11, 2005

(54) MULTI-LAYERED OPTICAL RECORDING MEDIUM

(75) Inventors: Tetsuro Mizushima, Tokyo (JP); Tsuyoshi Komaki, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/494,363

(22) PCT Filed: Nov. 11, 2002

(86) PCT No.: PCT/JP02/11751

§ 371 (c)(1),
(2), (4) Date: May 12, 2004

(87) PCT Pub. No.: WO03/042993

PCT Pub. Date: May 22, 2003

(65) Prior Publication Data

US 2004/0258871 A1 Dec. 23, 2004

(30) Foreign Application Priority Data

Nov. 13, 2001 (JP) .................... 2001-347064

(51) Int. Cl.⁷ ............................... B32B 3/02
(52) U.S. Cl. ............... 428/64.1; 428/64.4; 430/270.12
(58) Field of Search ............... 428/64.1, 64.4, 428/913; 430/270.12, 495.1, 945

(56) References Cited

U.S. PATENT DOCUMENTS

| 5,424,102 A | 6/1995 | Mizukuki et al. |
| 5,770,348 A | 6/1998 | Kondo |
| 6,576,319 B2 * | 6/2003 | Yoshinari et al. .......... 428/64.1 |
| 2001/0053122 A1 | 12/2001 | Yukumoto et al. |

FOREIGN PATENT DOCUMENTS

| JP | 55-28227 | 8/1978 |
| JP | 57-169938 | 10/1982 |
| JP | 57-172549 | 10/1982 |
| JP | 5-198004 | 8/1993 |
| JP | 8-279183 | 10/1996 |
| JP | 8-329524 | 12/1996 |
| JP | 2000-36132 | 2/2000 |
| JP | 2000-235733 | 8/2000 |
| JP | 2001-273674 | 10/2001 |
| JP | 2001-307381 | 11/2001 |

OTHER PUBLICATIONS

English Language Abstract of JP 57–169938, published Nov. 2, 2001.

English Language Abstract of JP 57–172549. published Oct. 23, 1982.

(Continued)

*Primary Examiner*—Elizabeth Mulvaney
(74) *Attorney, Agent, or Firm*—Greenblum & Bernstein, P.L.C.

(57) ABSTRACT

A multi-layered optical recording medium comprising a plurality of sets of at least a recording layer formed of an inorganic material and a resin layer formed of an energy-beam curable resin as an overlaying layer of the recording layer on a base with a fitting center hole formed in a center part. The recording layer except the recording layer immediately adjacent to the base are formed so that the inner circumferential edge of a cover layer, an upper layer, having a larger inner diameter than that of a spacer layer, a lower layer, is located on the outside of the inner circumferential edge of the recording layer in a range of 2 mm to 15 mm inclusive. The adhesive force between the spacer layer and the cover layer can be increased, and thus, separation at each inner circumferential edge between the recording layer and the spacer layer, between the recording layer and the cover layer, and between the spacer layer and the cover layer can be effectively avoided.

5 Claims, 3 Drawing Sheets

OTHER PUBLICATIONS

English Language Abstract of JP 8-279183, published Oct. 22, 1996.

English Language Abstract of JP 2000-36132, published Feb. 2, 2000.

English Language Abstract of JP 2001-273674, published Oct. 5, 2001.

English Language Abstract of JP 2000-235733, published Aug. 29, 2000.

* cited by examiner

FIG. 9
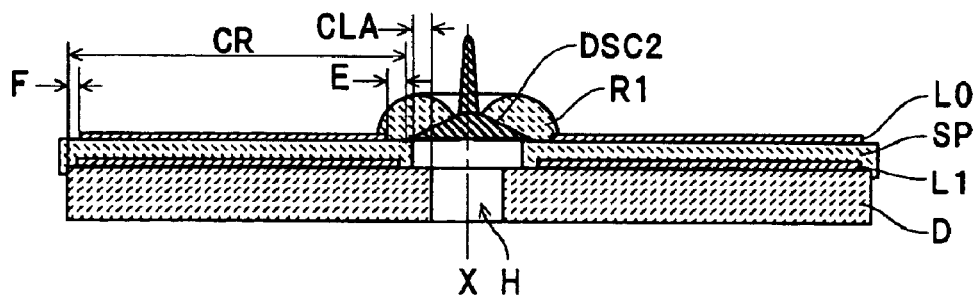
FIG. 10
| DISTANCE E [mm] | SEPARATION JUDGMENT RESULT |
|---|---|
| 1.0 | DEFECTIVE |
| 1.9 | DEFECTIVE |
| 2.0 | GOOD |
| 2.5 | GOOD |
FIG. 11
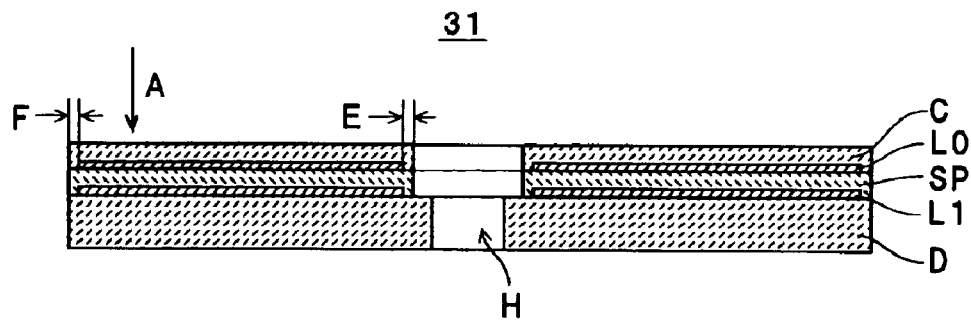

MULTI-LAYERED OPTICAL RECORDING MEDIUM

TECHNICAL FIELD

The present invention relates to a multi-layered optical recording medium composed of a plurality of sets, each of which includes at least a recording layer formed of an inorganic material and a resin layer formed of an energy-beam curable resin as an upper layer of the recording layer, formed on a base that has a fitting center hole formed in a center part thereof.

BACKGROUND ART

As shown in FIG. 11, a multi-layered optical recording medium 31 with a two-layer construction is known as a multi-layered optical recording medium of this type. The multi-layered optical recording medium 31 is a so-called "single-sided" multi-layered optical recording medium, where a cover layer C as a first resin layer, a recording layer L0 as a first recording layer, a spacer layer SP as a second resin layer, and a recording layer L1 as a second recording layer L1 are formed, in descending order of distance to a plate-like (for example, a disc-shaped) base D, on the base D that has a fitting center hole H formed in a center part thereof. In this case, the base D is manufactured using a resin material, such as polycarbonate, and fine minute convexes and concaves (not shown), such as grooves (guide grooves) and lands, are formed on a surface (the upper surface in FIG. 11) on the cover layer C side of the base D. The recording layer L1 as the second recording layer is composed of laminated layers such as a reflective film that is provided on these grooves, lands, etc., and reflects a laser beam set at a recording power and a laser beam set at a reproduction power (both are which are hereinafter referred to as the "laser beam" when distinction is not required), a phase change film whose reflectivity changes with changes in the optical constant due to irradiation with a laser beam set at the recording power, and a protective film that protects the phase change film. In this case, as one example, the reflective film, the phase change film, and the protective film are formed as thin films by sputtering non-organic materials such as metal materials and inorganic materials.

The spacer layer SP as the second resin layer is formed of light transmitting resin and has fine minute convexes and concaves (not shown) of grooves, lands, etc., formed in a surface of a cover layer C side thereof. The recording layer L0 as the first recording layer is composed of laminated layers such as a phase change film, protective film, and the like formed on these grooves, lands, etc. In this case, in the same way as the recording layer L1, the phase change film and protective film of the recording layer L0 are formed as thin films by sputtering non-organic materials, for example. The cover layer C as the first resin layer is formed of a light transmitting resin.

In this case, as shown in FIG. 11, the recording layers L0, L1 are formed so that the respective entire inner circumferential edges thereof are positioned a distance E (more specifically, around 1 mm) towards an outer periphery from inner circumferential edges of the spacer layer SP and the cover layer C, and the respective entire outer circumferential edges thereof are positioned a distance F (more specifically, around 1 mm) towards an inner circumference from an outer circumferential edges of the spacer layer SP and the cover layer C.

By irradiating the multi-layered optical recording medium 31 with a laser beam generated by an optical pickup in the direction shown by the arrow A in FIG. 11 (i.e., from the side of the base D on which the recording layers L1, L0, and the like are laminated), the recording of recording data onto the recording layers L0, L1 and the reproduction of recording data from the recording layers L0, L1 are carried out.

DISCLOSURE OF THE INVENTION

By investigating the multi-layered optical recording medium 31 described above, the inventors discovered the following problem. That is, with the multi-layered optical recording medium 31, the recording layer L1, which is formed of an inorganic material that has poor adhesion with organic materials, is present across a wide area between the base D and the spacer layer SP, and the recording layer L0, which is also formed of an inorganic material that has poor adhesion with organic materials, is present across a wide area between the spacer layer SP and the cover layer C. Accordingly, in the multi-layered optical recording medium 31, the contact surface area formed of organic material where there is favorable adhesion between the base D and the spacer layer SP (hereinafter, the "area of the joined part") and the contact surface area formed of organic material where there is favorable adhesion between the spacer layer SP and the cover layer C are both small, so that there is the problem that it is easy for the spacer layer SP to come away from the base D and the recording layer L1 and for the cover layer C to separate from the spacer layer SP and the recording layer L0. In particular, for the spacer layer SP and the cover layer C that are formed of energy-beam curing resin, the stress generated when the resin hardens and shrinks results in the adhesion between the spacer layer SP and the cover layer C falling below the adhesion between the spacer layer SP and the base D. This means that it is particularly easy for separation to occur between the spacer layer SP and the recording layer L0, between the cover layer C and the recording layer L0, and between the cover layer C and the spacer layer SP. Also, experiments carried out by the inventors confirmed that it is especially easy for separation to occur at the inner circumferential edges.

The present invention was conceived in view of the problem described above, and it is a principal object of the present invention to provide a multi-layered optical recording medium where separation between respective recording layers, aside from a recording layer closest to the base, and resin layers that are formed of energy-beam curable resin and are upper and lower layers of the recording layers can be avoided at inner circumferential edges thereof.

A multi-layered optical recording medium according to the present invention is composed of a plurality of sets laminated on a base with a fitting center hole formed in a center part thereof, each set including at least a recording layer formed of an inorganic material and a resin layer formed of an energy-beam curable resin as an upper layer of the recording layer, wherein the respective recording layers, aside from a recording layer closest to the base, are formed so that an inner circumferential edge thereof is positioned in a range of 2 mm to 15 mm inclusive, towards an outer periphery from an inner circumferential edge of a resin layer, out of the resin layers positioned above and below the respective recording layers, with a larger inner circumferential diameter. It should be noted that for the present invention, the expression "inorganic material" includes metal materials.

According to this multi-layered optical recording medium, respective recording layers aside from the recording layer closest to the base are formed so that the inner circumferential edges thereof are positioned a distance in a range of 2 mm to 15 mm inclusive from the inner circumferential edge of a resin layer, out of upper and lower resin layers for the recording layers, with a larger inner circumferential diameter. Since it is possible to strengthen the adhesive force between respective resin layers that are the upper layers and the lower layers for the recording layers, it is possible to effectively prevent separation, which easily occurs in a conventional multi-layered optical recording medium, from occurring at respective inner circumferential edge parts between the recording layers and the lower resin layers, between the recording layers and the upper resin layers, and between the respective resin layers. This means that it is possible to mass produce an optical recording medium that has high reliability.

In this case, it is particularly effective to construct the multi-layered optical recording medium so that recording and reproduction can be carried out by irradiating the multi-layered optical recording medium with a laser beam set at a recording power or a reproduction power from a side of the base on which the sets are laminated.

It should be noted that the disclosure of the present invention relates to a content of Japanese Patent Application 2001-347064 that was filed on 13 Nov. 2001 and the entire content of which is herein incorporated by reference.

BRIEF DESCRIPTION OF THE DRAWINGS

FIG. 9 is a cross-sectional side view of the base D in a state where an applied liquid R1 has been dripped onto a disc-like member DSC2.

FIG. 10 is an experiment results table showing whether separation occurs for the spacer layer SP and a cover layer C of the multi-layered optical recording medium 1 when a distance E has been varied.

FIG. 11 is a cross-sectional side view showing the construction of a multi-layered optical recording medium 31.

BEST MODE FOR CARRYING OUT THE INVENTION

Figure 1:
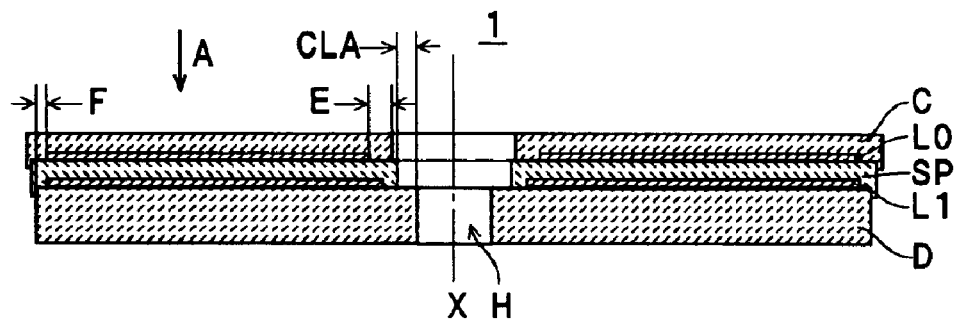
FIG. 1 is a cross-sectional side view showing the construction of a multi-layered optical recording medium 1.

Preferred embodiments of a multi-layered optical recording medium according to the present invention will now be described with reference to the attached drawings.

First, as one example, the construction of a multi-layered optical recording medium 1 with two layers will be described with reference to FIG. 1. It should be noted that component elements that are the same as in the multi-layered optical recording medium 31 have been given the same reference numerals and redundant description has been omitted.

The multi-layered optical recording medium 1 is a so-called "single-sided" multi-layered optical recording medium (a rewritable optical recording medium) provided with a plurality of recording layers (for example, phase change recording layers) formed of inorganic materials, and is composed of a set including at least a recording layer L1 and a resin layer (spacer layer SP) as an upper layer of the recording layer L1 and a set including at least a recording layer L0 and a resin layer (cover layer CP) as an upper layer of the recording layer L0 laminated in that order on a base D. More specifically, the multi-layered optical recording medium 1 is composed with a cover layer C as a first resin layer, a recording layer L0 as a first recording layer, a spacer layer SP as a second resin layer, and a recording layer L1 as a second recording layer being laminated on a base D in descending order of distance to the base D.

The base D is formed by injection molding an organic material (for example, a resin such as polycarbonate) in a plate-like form (as a disc, for example) with a fitting center hole H formed in a center part. On one surface (the upper surface in FIG. 1) of the base D, grooves (not shown) and lands (not shown) and the like for guiding a laser beam are formed as fine minute convexes and concaves in spirals in a region on an outer periphery side of a clamping area CLA set in a periphery of the fitting center hole H. The recording layer L1 is composed of a reflective film, a phase change film, and a protective film and the like laminated on the grooves, lands, and the like formed in the surface of the base D. In this case, the reflective film is formed by sputtering a metal material in the form of a thin film, and the phase change film and the protective film are formed by sputtering inorganic materials in the form of thin films.

The spacer layer SP is formed of a light transmitting resin (more specifically, an energy beam-curable resin (as one example, a UV curable resin) with a light-transmitting characteristic) as an organic material, and grooves (not shown), lands (not shown), and the like are formed on a cover layer C-side surface thereof. The recording layer L0 is composed of a phase change film, a protective film, and the like laminated on the grooves, lands and the like formed in the surface of the spacer layer SP. In this case, the phase change film of the recording layer L0 is composed in the same way as the phase change film of the recording layer L1. Also, the phase change film and the protective film are formed in the form of thin-films through vapor deposition by sputtering inorganic materials. The cover layer C is a layer that protects the recording layer L0 from scratching and also acts as a part (a lens) of an optical system, and is formed of a light transmitting resin (more specifically, an energy beam-curable resin (as one example, a UV curable resin) with a light-transmitting characteristic) as an organic material.

Also, as shown in FIG. 1, the recording layer L0 is formed so that the entire inner circumferential edge thereof is positioned a distance E (in a range of 2 to 15 mm inclusive) towards an outer periphery from an inner circumferential edge of a layer, out of the cover layer C and the spacer layer SP as the upper and lower layers thereof, that has a larger inner circumferential diameter, and the entire outer circumferential edge thereof is positioned a distance F (around 1 mm) towards an inner periphery from an outer circumferential edge of the spacer layer SP and the cover layer C. Accordingly, the contact surface area at the inner peripheries of the spacer layer SP and the cover layer C is over twice that of the multi-layered optical recording medium 31. As a result, in the multi-layered optical recording medium 1, the adhesive force between the spacer layer SP and the cover layer C is increased to double or more. On the other hand, at the outer circumferential edge, the spacer layer SP is bent around an outer circumferential surface of the base D, and at the outer circumferential edge, the cover layer C is bent around an outer circumferential surface of the spacer layer SP. This means that the contact surface area between the base D and the spacer layer SP at the outer periphery and the contact surface area between the spacer layer SP and cover layer C at the outer periphery are both increased, so that the adhesive forces are also increased.

It should be noted that the inventors carried out predetermined high temperature/high humidity experiments on a variety of multi-layered optical recording media 1 where the inner circumferential diameter of the cover layer C is set larger than the inner circumferential diameter of the spacer layer SP and where the distance E from the inner circumferential edge of the cover layer C to the inner circumferential edge of the recording layer L0 is varied, and respectively checked whether separation occurred between the spacer layer SP and the recording layer L0, between the cover layer C and the recording layer L0, and between the cover layer C and the spacer layer SP. In this case, the contact surface area between the spacer layer SP and the cover layer C at the inner periphery is set by the distance E from the inner circumferential edge of the cover layer C to the inner circumferential edge of the recording layer L0. FIG. 10 shows the results of these experiments. From these experiment results, it was confirmed that for a multi-layered optical recording medium 1 fabricated with the distance E set at 1.9 mm or below, separation occurred on the inner circumferential edge side of some of the respective interfaces between the spacer layer SP and the recording layer L0, the cover layer C and the recording layer L0, and the cover layer C and the spacer layer SP. On the other hand, it was confirmed that no separation occurred for a multi-layered optical recording medium 1 fabricated with the distance E set at 2 mm or above. Also, separation could not be found on the outer circumferential edge side between the spacer layer SP and the cover layer C. Accordingly, by setting the distance E from the inner circumferential edge of the layer, out of the spacer layer SP and the cover layer C, with the larger inner circumferential diameter to the inner circumferential edge of the recording layer L0 at 2.0 mm or above, it is possible to effectively avoid separation on the inner circumferential edge side between spacer layer SP and the recording layer L0, the cover layer C and the recording layer L0, and the cover layer C and the spacer layer SP. As a result, it is possible to manufacture a multi-layered optical recording medium 1 that is highly reliable. However, to maintain the required recording capacity for the recording layer L0, it is necessary to set the maximum value for the distance E at around 15 mm or below. Accordingly, the distance E should preferably be set in a range of 2 mm to 15 mm inclusive. It should be noted that these experimental results were obtained by leaving optical recording media 1, which have been manufactured using a base D with an outer diameter of 120 mm and a fitting center hole H with a diameter of 15 mm formed in a center part, in high temperature/high humidity conditions with a relative humidity of 85% and a temperature of 80° C. for fifty hours and then investigating the occurrence of separation.

With this multi-layered optical recording medium 1, the recording layers L1, L0 are irradiated in the direction shown by the arrow A in FIG. 1 (i.e., from the side of the base D on which the recording layers L1, L0, and the like are laminated) by a laser beam (for example, a laser beam with a wavelength of 405 nm set at the recording power) generated by an optical pickup to cause phase changes between an amorphous state and a crystal state so that recording marks are recorded and erased. More specifically, when the recording layers L1, L0 are irradiated with this laser beam, the irradiated parts are heated to the melting point or above and then rapidly cooled to enter an amorphous state, so that recording marks are formed in accordance with binary recording data. Also, when irradiation is carried out with this laser beam, irradiated parts of the recording layers L1, L0 are heated to the crystallization temperature or above and then gradually cool so as to be crystallized, thereby deleting the recording marks. In addition, by carrying out irradiation in the direction of the arrow A in FIG. 1 with a laser beam set at the reproduction power emitted from the optical pickup, recording data is read from the recording layers L0, L1.

Next, a method of manufacturing the multi-layered optical recording medium 1 will be described with reference to FIG. 1 to FIG. 8.

Figure 2:
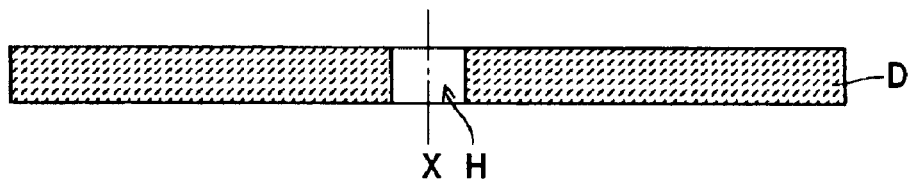
FIG. 2 is a cross-sectional side view showing the construction of a base D that has fine minute convexes and concaves formed in a surface thereof.

First, a metal stamper in whose surface reversed fine minute convexes and concaves, which are the reverse of the fine minute convexes and concaves of grooves, lands, and the like formed in the surface of the base D, are formed is set inside a resin molding mold. Next, by injection molding a resin material (for example, PC (polycarbonate)) into this mold, as shown in FIG. 2, the base D in whose surface (the upper surface in FIG. 2) fine minute convexes and concaves (not shown) of grooves, lands, and the like are formed (transferred) is fabricated.

Figure 3:
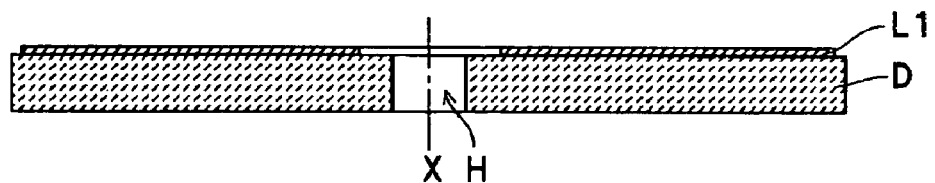
FIG. 3 is a cross-sectional side view of a base D on whose surface a recording layer L1 has been formed.

Next, as shown in FIG. 3, the recording layer L1 is formed, by sputtering for example, on the surface of the fabricated base D in which the fine minute convexes and concaves are formed.

Figure 4:
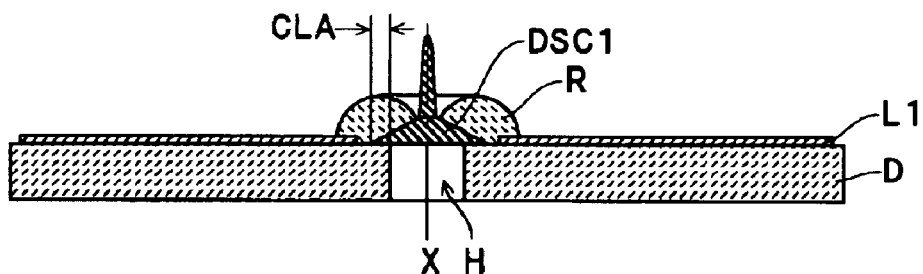
FIG. 4 is a cross-sectional side view of the base D in a state where applied liquid R has been dripped onto a surface of a disc-like member DSC1.
Figure 5:
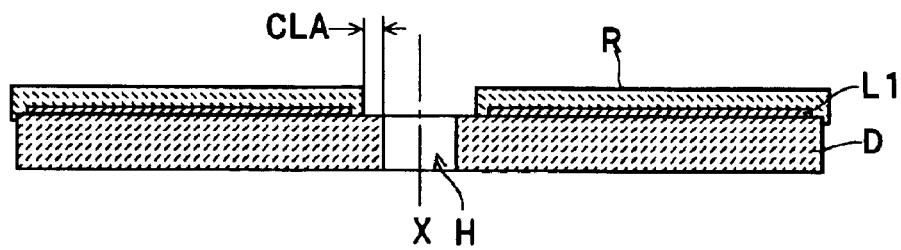
FIG. 5 is a cross-sectional side view of the base D in a state where the applied liquid R has been applied with a uniform thickness on the surface by spin coating.

After this, the spacer layer SP is formed on the base D and the recording layer L1. More specifically, as shown in FIG. 4, a disc-like member DSC1 in the shape of an umbrella is placed on the center part of the base D, and an applied liquid R is applied by spin coating after dripping the applied liquid R onto the upper surface of the disc-like member DSC1. After this, the rotation of the base D is stopped and the disc-like member DSC1 is removed from the base D. By doing so, as shown in FIG. 5, a layer of the applied liquid R is formed with an approximately uniform intended thickness from the inner periphery to the outer periphery. In this case, by applying the applied liquid R in a state where the fitting center hole H and the clamping area CLA of the base D are covered with the disc-like member DSC1, the spacer layer SP is formed on the recording layer L1 without being formed on the clamping area CLA. As one example, when using a disc-like member DSC1 where the diameter of the part contacting the base D is 36 mm, the inner circumferential diameter of the applied layer of the applied liquid R is set at 36 mm. Also, during the spin coating, part of an excess amount of the applied liquid R that has reached the outer circumferential edge part of the base D is thrown off the base D by centrifugal force applied to the base D. On the other hand, another part of this excess amount that is not thrown off and remains on the outer circumferential edge part of the base D becomes bent around onto an outer circumferential surface of the base D.

Figure 6:
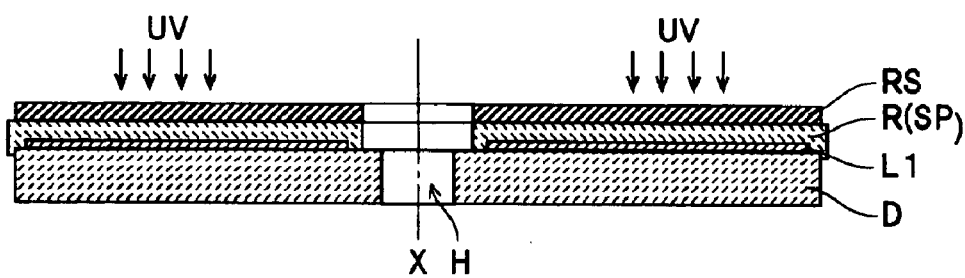
FIG. 6 is a cross-sectional side view of the base D and a stamper RS in a state where the stamper RS has been placed on the base D on which a film of the applied liquid R has been formed and irradiation has been carried out with UV rays to harden the applied liquid R.

Next, after the rotation of the D has been stopped, as shown in FIG. 6, a stamper RS is mounted on the base D. In this case, the stamper RS is fabricated using a resin material with a light transmitting characteristic and in one of whose surfaces (the lower surface in FIG. 6) is formed reversed fine minute convexes and concaves with the same orientation as the metal stamper described above. Next, the applied liquid R is given time to take the shape of the lower surface of the stamper RS, and then the base D is irradiated with UV rays as an energy beam. At this time, the irradiating UV rays pass through the stamper RS and the applied liquid R between the base D and the stamper RS and the applied liquid R bent around onto the outer circumferential surface of the base D harden, thereby completing the formation of the spacer layer SP.

Figure 7:
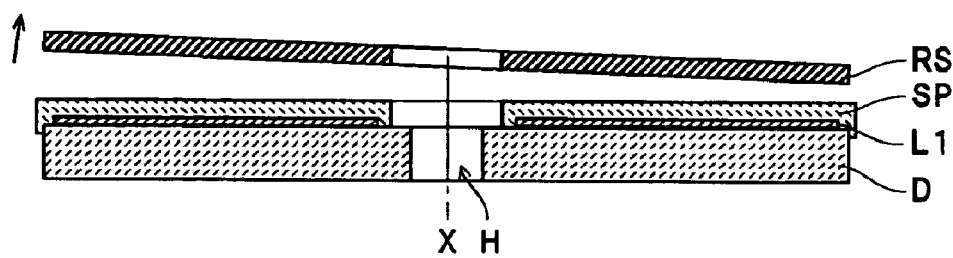
FIG. 7 is a cross-sectional side view of the base D in a state where the stamper RS has been removed and a spacer layer SP has been formed.
Figure 8:
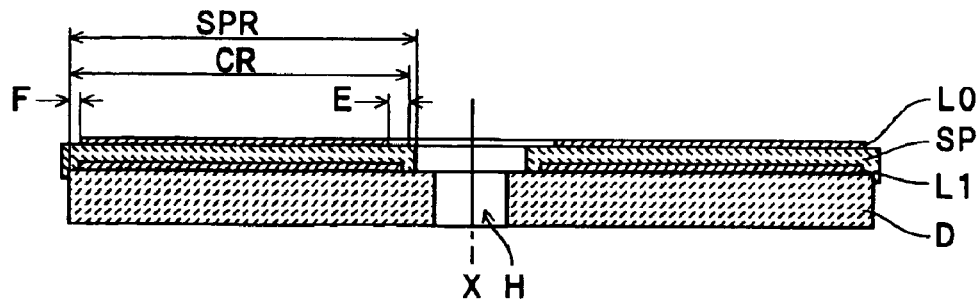
FIG. 8 is a cross-sectional side view of the base D in a state where a recording layer L0 has been formed on the spacer layer SP.

Next, as shown in FIG. 7, the stamper RS is removed from the base D. Next, as shown in FIG. 8, the recording layer L0 is formed by sputtering, for example, on a surface of the spacer layer SP in which the fine minute convexes and concaves are formed. In this case, the recording layer L0 is formed so that the outer circumferential edge of the recording layer L0 is positioned the distance F (around 1 mm) towards the inner periphery from the outer circumferential edge (the outermost edge of the disc) of the formed range SPR of the spacer layer SP, and the recording layer L0 is formed the distance E (a value in a range of 2 mm to 15 mm inclusive, and, as one example, 2 mm) towards the outer periphery from the inner circumferential edge of the layer out of the spacer layer SP (the formed range SPR thereof) and the cover layer C (the formed range CR thereof) that has the larger inner circumferential diameter. As one example, in the present embodiment, the inner circumferential diameter of the cover layer C (as described later, 37 mm) is larger than the inner circumferential diameter of the spacer layer SP (as described above, 36 mm), so that the recording layer L0 is formed with the inner circumferential edge of the cover layer C as a reference. Accordingly, the recording layer L0 is formed so that an inner circumferential diameter thereof is 41 mm. After this, spin coating (see FIG. 9) is carried out using a disc-like member DSC2 where a diameter of the part contacting the base D (strictly speaking, the spacer layer SP) is larger (as one example, 37 mm) than the corresponding diameter of the disc-like member DSC1, so that an applied liquid R1 is applied with a uniform thickness on a surface of the recording layer L0 and the spacer layer SP. Next, by hardening the applied liquid R by irradiation with UV rays, the cover layer C is formed. In this case, the fitting center hole H and the clamping area CLA of the base D are covered by the disc-like member DSC2, so that the cover layer C is formed on the recording layer L0 without being formed inside the clamping area CLA. In addition, during the spin coating, in the same way as when the spacer layer SP is formed, UV-curable resin that has not been thrown off and remains on the outer circumferential edge part of the spacer layer SP is bent around onto the outer circumferential surface of the spacer layer SP and is hardened in this state. By carrying out the above process, as shown in FIG. 1, the manufacturing of the multi-layered optical recording medium 1 is completed.

In this way, according to this multi-layered optical recording medium 1, the entire inner circumferential edge of the recording layer L0 is positioned the distance E (a value in a range of 2 mm to 15 mm inclusive) towards an outer periphery from an inner circumferential edge of a layer, out of the spacer layer SP and the cover layer C, with the larger inner circumferential diameter, so that compared to the conventional multi-layered optical recording medium 31, it is possible to increase the adhesive force between the inner periphery part of the spacer layer SP and the inner periphery part of the cover layer C, and as a result it is possible to effectively prevent separation from occurring at the inner periphery between the spacer layer SP and the recording layer L0, between the cover layer C and the recording layer L0, and between the cover layer C and the spacer layer SP. This means it is possible to mass produce the multi-layered optical recording medium 1 that has high reliability. When forming the spacer layer SP and the cover layer C by spin coating, by using the disc-like member DSC1 and the disc-like member DSC2, respectively, it is possible to form the respective inner circumferential edges of the spacer layer SP and the cover layer C as well-formed circles to the outside of the clamping area CLA. This means that it is possible to effectively prevent parts of the spacer layer SP and the cover layer C from extending into the clamping area CIA, so that only the base D that is formed by injection molding very hard resin, such as polycarbonate, is exposed inside the clamping area CIA. Accordingly, it is possible to favorably maintain both the flatness and the surface hardness of the clamping area CLA, so that multi-layered optical recording media 1 that can be reliably clamped (chucked) by a recording/reproducing apparatus can be mass produced.

It should be noted that the present invention is not limited to the above embodiment, and can be modified as appropriate. For example, in the above embodiment of the present invention, an example is described where the inner circumferential diameter of the cover layer C is larger than the inner circumferential diameter of the spacer layer SP, so that the recording layer L0 is formed so that the inner circumferential edge thereof is positioned the distance E from the inner circumferential edge of the cover layer C, but it is also possible to use a disc-like member DSC1 with a larger diameter than the disc-like member DSC2 to form the inner circumferential diameter of the spacer layer SP larger than the inner circumferential diameter of the cover layer C and to form the recording layer L0 so that the inner circumferential edge thereof is positioned the distance E from the inner circumferential edge of the spacer layer SP. In this case, the inner periphery part of the cover layer C is constructed so as to bend around the inner circumferential edge of the spacer layer SP and directly contact the base D, so that the adhesive force between the inner periphery part of the spacer layer SP and the inner periphery part of the cover layer C can be increased and the innermost periphery part of the cover layer C tightly contacts the base D, resulting in it being possible to considerably increase the resistance to separation.

Also, when the spacer layer SP and the cover layer C are formed during the manufacturing of the multi-layered optical recording medium 1, it is possible to use a spin coating method that drips the applied liquids R onto the respective inner peripheries of the formed range SPR of the spacer layer SP and the formed range CR of the cover layer C without using the disc-like member DSC1 and the disc-like member DSC2. In addition, the spacer layer SP can also be fabricated from the inner periphery side of the clamping area CLA. In this case, a very hard resin is applied onto the base D from the inner periphery of the clamping area CLA by spin coating, a stamper RS, whose surface that faces the resin applied to the clamping area CLA is formed so as to be a flat surface, is placed on the base D, and the flat surface of the stamper RS is transferred to the surface of the spacer layer SP positioned inside the clamping area CLA. On the other hand, the cover layer C is formed so that the inner periphery part thereof does not extend within the clamping area CLA. By doing so, a spacer layer SP formed of hard resin with a flat surface is constructed so as to be exposed inside the clamping area CIA. Accordingly, it is possible to form a clamping area CLA that is both flat and hard on a multi-layered optical recording medium. It should be noted that when the spacer layer SP is fabricated from the inner periphery of the clamping area CIA, as one example, it is possible to form the spacer layer SP by inserting a center chucking capable of elastic deformation into the fitting center hole H and causing the center chucking to elastically deform and block the fitting center hole H to chuck the base D, and then dripping the applied liquid R onto the center chucking and spin coating the base D.

Also, in the above embodiment of the present invention, a multi-layered optical recording medium whose cover layer C is formed by spin coating is described, although the present invention can also be applied to a multi-layered optical recording medium constructed with a sheet (a disc-like sheet in whose center a fitting center hole of a freely chosen diameter has been formed) made of polycarbonate (PC) attached as a protective cover onto the uppermost resin layer. In this case, the uppermost resin layer (energy-beam curable resin) functions as an adhesive layer. For a multi-layered optical recording medium of this construction, it is possible to effectively avoid separation of the resin layers from the base D. Also, in the above embodiment of the present invention, an example is described where a rewritable multi-layered optical recording medium 1 is manufactured, although the present invention can also be applied to a write-once multi-layered optical recording medium where inorganic materials are used to the respective recording layers L0, L1. This is particularly effective for a multi-layered recording medium irradiated with a laser beam set at the recording power or the reproduction power from the cover layer C side, not the base D side. Also, the base D is not limited to being disc-like, and can be formed in a variety of shapes, such as a rectangle or other polygon, or an oval or the like. Also, although the embodiments of the present invention have been described using an example of a multi-layered optical recording medium 1 including two recording layers L1, L0, it is possible to effectively apply the present invention to a multi-layered optical recording medium with three or more recording layers.

As described above, according to this multi-layered optical recording medium, respective recording layers aside from the recording layer closest to the base are formed so that the inner circumferential edges thereof are positioned a distance in a range of 2 mm to 15 mm inclusive from the inner circumferential edge of a resin layer, out of upper and lower resin layers for the respective recording layers, with a larger inner circumferential diameter. Since it is possible to strengthen the adhesive force between respective resin layers that are the upper layer and the lower layer for the recording layers, it is possible to effectively prevent separation, which easily occurs in a conventional multi-layered optical recording medium, from occurring at respective inner circumferential edge parts between the recording layers and the lower resin layers, between the recording layers and the upper resin layers, and between the respective resin layers. This means that it is possible to realize an optical recording medium that has high reliability.

What is claim is:

1. A multi-layered optical recording medium composed of a plurality of sets laminated on a base with a fitting center hole formed in a center part thereof, each set including at least a recording layer formed of an inorganic material and a resin layer formed of an energy beam curable resin as an upper layer of the recording layer, wherein the respective recording layers, aside from a recording layer closest to the base, are formed so that an inner circumferential edge thereof is positioned in a range of 2 mm to 15 mm inclusive, towards an outer periphery from an inner circumferential edge of a resin layer, out of the resin layers positioned above and below the respective recording layers, with a larger inner circumferential diameter.

2. A multi-layered optical recording medium according to claim 1, constructed so that recording and reproduction can be carried out by irradiating the multi-layered optical recording medium with a laser beam set at a recording power or a reproduction power from a side of the base on which the sets are laminated.

3. A multi-layered optical recording medium, comprising:

a plurality of sets laminated on a base with a fitting center hole formed in a center part thereof, each set respectively including at least a recording layer including an inorganic material and a resin layer including an energy beam curable resin as an upper layer of the recording layer, wherein each recording layer above a recording layer closest to the base respectively has an inner circumferential edge positioned by a separation distance toward an outer periphery from an inner circumferential edge of a resin layer having a larger inner circumferential diameter among either a first resin layer positioned above the recording layer or a second resin layer positioned below the recording layer, the first and second resin layers mutually adhering to each other in a contact area corresponding to the separation distance, and wherein the first resin layer bends around an outer circumferential edge of the second resin layer.

4. A multi-layered optical recording medium, comprising:

a plurality of sets laminated on a base with a fitting center hole formed in a center part thereof, each set respectively including at least a recording layer including an inorganic material and a resin layer including an energy-beam curable resin as an upper layer of the recording layer, wherein each recording layer above a recording layer closest to the base respectively has an inner circumferential edge positioned by between 2 mm and 15 mm, inclusively, toward an outer periphery from an inner circumferential edge of a first resin layer positioned above the recording layer or a second resin layer positioned below the recording layer, and wherein the first resin layer bends around an inner circumferential edge of the second resin layer.

5. A multi-layered optical recording medium according to claim 4, wherein an inner circumferential edge of the first resin layer adheres to the base.

* * * * *